US006678747B2

(12) United States Patent
Goossen et al.

(10) Patent No.: US 6,678,747 B2
(45) Date of Patent: Jan. 13, 2004

(54) SCALABLE DATA COLLECTION AND COMPUTING APPARATUS

(75) Inventors: Emray Rein Goossen, Albuquerque, NM (US); Charles Boyd Anderson, Albuquerque, NM (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/379,375

(22) Filed: Aug. 23, 1999

(65) Prior Publication Data
US 2003/0028687 A1 Feb. 6, 2003

(51) Int. Cl.[7] .............................................. G06F 3/00
(52) U.S. Cl. ............................. 710/2; 364/708; 710/62
(58) Field of Search ..................... 710/2, 62; 364/708; 361/400–600

(56) References Cited

U.S. PATENT DOCUMENTS

| | | | | |
|---|---|---|---|---|
| 4,773,868 A | | 9/1988 | Heinecke ..................... 439/69 |
| 5,430,607 A | * | 7/1995 | Smith ......................... 361/683 |
| 5,568,356 A | | 10/1996 | Schwartz ..................... 361/679 |
| 5,602,721 A | * | 2/1997 | Slade et al. .................. 206/504 |
| 5,737,189 A | | 4/1998 | Kammersgard et al. ..... 361/726 |
| 5,909,357 A | * | 6/1999 | Orr ............................. 361/687 |
| 5,940,274 A | * | 8/1999 | Sato et al. ................. 312/223.2 |
| 6,122,687 A | * | 9/2000 | Jung ........................ 379/88.13 |

OTHER PUBLICATIONS

*Production Started on Innovative Bus Terminal;* XP–001013020; Intelligence "Clamped to a Rail" May 1995; p. 14–18. (translation provided).

* cited by examiner

*Primary Examiner*—Jeffrey Gaffin
*Assistant Examiner*—Harold Kim
(74) *Attorney, Agent, or Firm*—Kurt A. Luther; Dennis F. Armijo

(57) ABSTRACT

A method and apparatus for collecting and distributing information to and from a computing element that is quickly scalable at the installation to varying types and numbers of signals. Standard sized modules containing a generalized set of; computation, discrete I/O, analog I/O, serial I/O, adaptable I/O, etc. or any combination thereof, provide the building blocks that can be attached to each other to provide the desired combination of functions. These modular components are mated to each other through a simple serial interface providing the inter-module communication interface and local power requirements. The modules are quickly stacked together and snapped in place in a manner supporting severe environmental conditions.

34 Claims, 15 Drawing Sheets

SCALABLE DATA COLLECTION AND COMPUTING APPARATUS

BACKGROUND OF THE INVENTION

The invention relates generally to remote data collection and distribution and more particularly to a method and apparatus for a common architecture for remote collection and distribution of analog and digital data with stackable and disposable modules.

In the past, the designs for input/output (I/O) of a computer were generated in the form of an electronic component assembly plugged into the computer chassis itself or as electronic component assembly plugged into a separate data collection computer. These electronic component assemblies were either replaceable on the vehicle in a modular form, or replaced and repaired in the shop when the complete computer was returned for service.

Each vehicle has unique interfaces dictated by technology available at the time or by its functional requirements. This usually results in computer and electronic component assembly designs unique for that vehicle. VME and PC104 style packaging methods have been applied to address standardization of modules or assemblies. However, the close coupling of the input/output electronic component assemblies with the computation assemblies and computer chassis restricts the ability to address technology obsolescence and technology refreshment.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention discloses a method and apparatus for gathering and distributing signals to a computation device. The scalable data concentrator is made up of standard building blocks that can be assembled and disassembled at the vehicle or work station to support the I/O requirements for the specific location on the vehicle. It supports the expansion and collapse of the data concentrator to adjust to the I/O complement required for the unique application without modification to the elements that make up the scalable data concentrator. Adding additional I/O or data processing functions is a simple matter of stacking the additional modular elements. Each installation of a scalable data concentrator is made up of standard modules which preferably contains a controller module and a power supply module. Communication between the modules and power for the I/O module computing elements are provided through a stacking connector.

The modules follow object oriented design practices from the hardware as well as the software standpoint. That is, all the functions and properties required to interface with the type of I/O it supports are contained within the module. These can include source impedance, load impedance, electro magnetic interference (EMI) protection, anti-aliasing filtering, data packing, unique I/O signal references, data reduction, loop closures, and communication with the controller module. They are programmable for gains, filtering characteristics, and I/O data rates.

The modules include electronic devices, integrated circuits, resistors, capacitors, and other components required to provide the functionality of that module preferably mounted on a printed wiring board. This assembly is either housed within a chassis or embedded within a thermally conductive material. The module assembly can also be embedded in a thin layer of electrically conductive material to provide faraday cage protection against electromagnetic interference. Each module preferably contains a connector in support of its type of I/O and a stacking connector for inter-module communication and power. The stacking connector is inserted into its neighbor module forming an EMI seal. Mechanical alignment and support between modules and between the data concentrator assembly and vehicle mounting tray is preferably provided by guide pins. The guide pins also provide a means of keying module type with vehicle insertion location. A preferred module assembly is held together by snapping a mechanism that allows quick assembly and disassembly. Only the power supply and controller modules have handles as they are required for each data concentrator assembly. They are preferably structured so that they are located at opposite ends of the assembly.

The inter-module communication contained within the stacking connector is preferably made up of an industry standard communication link such as, RS485, Universal Serial Bus (USB), 1394, or the like. It can be used for downloading code into the individual modules, synchronizing modules, and data transfers. The serial bus can be either single or multiple redundant. All common power requirements are also passed to each module through the stacking connector. Unique and high power requirements are provided at each modules individual I/O connector as necessary.

A primary object of the present invention is to provide a standardized remote collection and distribution apparatus for analog and discrete data.

Another object of the invention is to provide stacked modules for a variety of collection and distribution devices.

Yet another object of the invention is to provide each module with a standardized connector containing a serial bus and power.

An additional primary object of the invention is to provide standard I/O modules that are configured by the controller module upon application of power.

An object of the module configurability is the controller modules assessment of its vehicle installation environment and the I/O devices and I/O compliment required for that location.

An additional object of the module configurability is the ability of the controller module to assign signal types, signal direction, signal gains, signal filtering, and data transfer rates to each adaptable I/O device type.

A primary advantage of the present invention is its ease of technology refreshment and technology insertion.

Another advantage of the present invention is its open architecture that is easily expandable for the unique requirements of a particular installation.

Yet another advantage of the present invention is that the individual Scalable Data Concentrator (SDC) modules are designed for interchangeability and adaptability and their low cost makes them a throw away maintenance item.

Another advantage of the present invention is that the SDC "backplane" is implemented with an industry standard serial bus (USB) that supports usage of the many commercial products targeted for the PC market.

Other features of the present invention will become apparent to those of skill in the art upon examination of the following detailed description of the invention or can be learned by practice of the present invention. It should be understood: however, that the detailed description of the invention and the specific examples presented, while indicating certain embodiments of the present invention, are provided for illustration purposes only because various changes and modifications within the spirit and scope of the invention will become apparent to those of skill in the art, from the detailed description of the invention and claims that follow.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention, and are not to be construed as limiting the invention. In the drawings.

DETAILED DESCRIPTION OF THE INVENTION

The SDC data collection architecture of the present invention provides the benefits of a scalable remote I/O collection architecture allowing the number of I/O requirements to be altered and reconfigured to tailor the SDC to the I/O needs in the specific location in the vehicle. Adding additional I/O or data processing functions is a simple matter of inserting the additional modular elements into the SDC stack. It also has the capability to function as a stand alone computer with appropriate input/output (I/O) and processing modules combined as part of the stack.

A standard interface, which provides power as well as the serial data bus, is used to simplify interconnections to individual modular functions, software and or hardware. The architectural functional boundary definitions support module functional design independence.

The SDC design supports expansion and tailoring of the I/O to the requirements of each specific vehicle installation location. The external I/O connection is through a separate blind mate connector supporting the maximum I/O implementable on the board area for that I/O type. Module power and inter-module communication, by serial bus, are incorporated on the "backplane" stacking connector.

Any type of module can be inserted into the SDC pack as long as it meets the mechanical and electrical interfacing definitions. The signal by signal adaptability of the Adaptable I/O module and the selectable filtering and gains on the Unique I/O modules provide additional flexibility to the spare I/O remaining at each SDC location.

All modules provide the ability to access their health through a serial bus interrogation. They report health information on a regular basis while in the flight mode.

Figure 1:
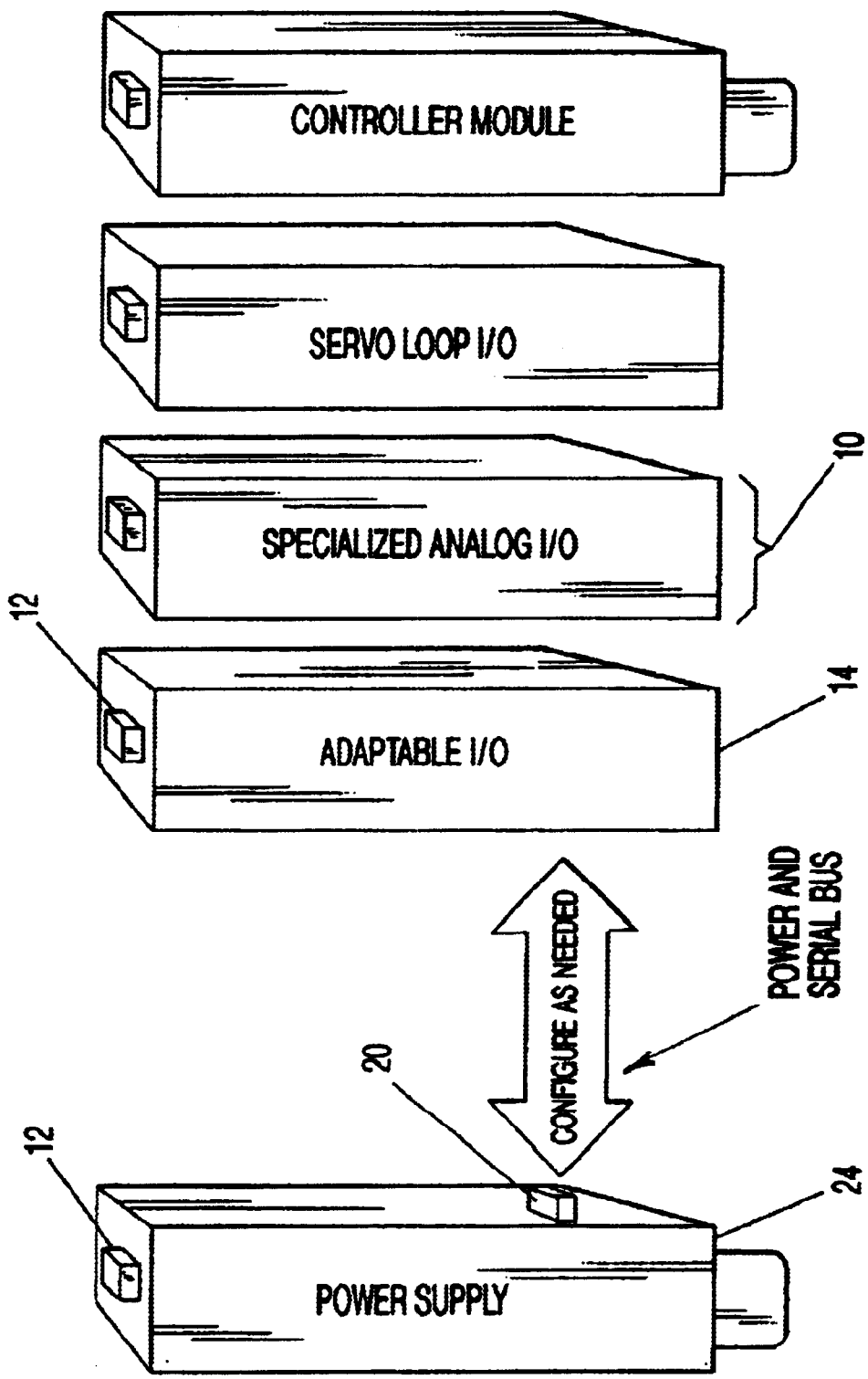
FIG. 1 depicts the stackable concept in accordance with the present invention.

Modules 10 support a module stacking methodology as shown in FIG. 1. The expansion "backplane bus" includes of a pair of serial buses electrically compatible with the PC Universal Serial Bus (USB) standard, a module programming bus electrically compatible with the SPI standard, and power from the power supply module 24.

Each Module 10 contains an I/O connector 12 for the type of I/O unique to that module. For example, all discrete I/O types will be connected to an Adaptable I/O Module 14. Each module 10 provides the appropriate Electro Magnetic Interference (EMI) protection for its I/O type. One source of vehicle power is connected to the SDC power supply to provide power to all the SDC Module electronics. High current power sources, such as 2A 28 Vdc/Open discretes, are sourced from separate vehicle power inputs to that modules external I/O connector 12 rather than from the SDC power supply.

Figure 2:
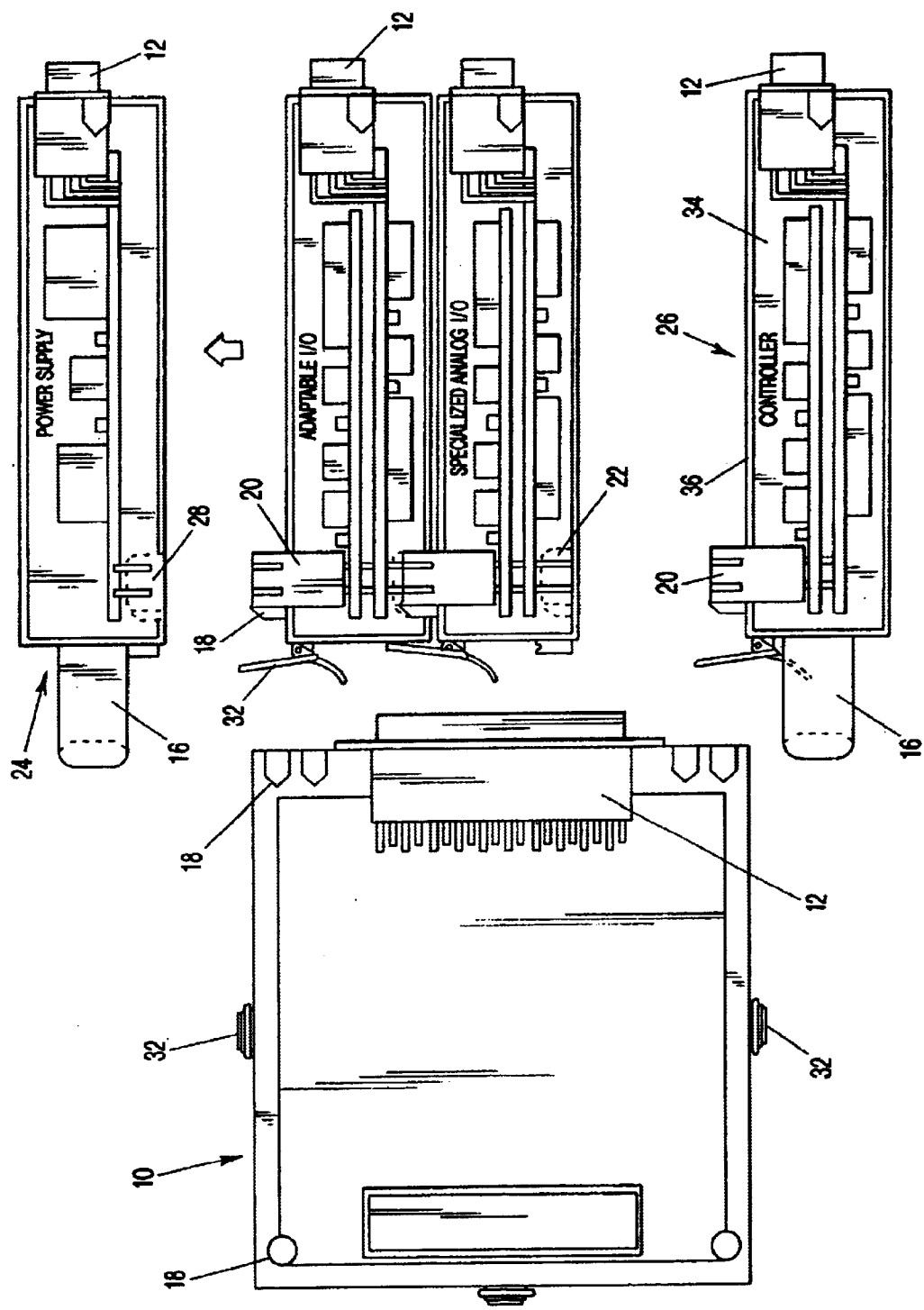
FIG. 2 shows construction and stacking mechanisms of the modules in accordance with the present invention.

Modules 10 are designed in standard size/standard form factor and have a common bus interface 20 and mechanical mounting 18 that supports stacking as shown in FIG. 2.

Each module 10 preferably provides the interface bus mating connector 20 and compatible receptacle 22 with the exception of the power supply 24 and controller modules 26. The power supply 24 and controller modules 26 are required for all installations and therefore each have a handle 16 and bus terminations with a socket 28 and connector 30 respectively.

Mechanical stacking is accomplished through the snapping clamps 32 located on two or three sides of each module or similar means which are well known in the art. This design provides for quick access to replacement of a module in the middle of the stack.

All modules 10 preferably have a two-layer encapsulation to eliminate the cost of module chassis and to enhance the vibration and thermal characteristics. The first layer 24 is a lightweight thermally conductive material. The second layer 36 is both a thermally and electrically conductive material that provides a good EMI shield. Heat dissipation can be through bulkhead attachment and optional fins on each module (not shown).

Figure 3:
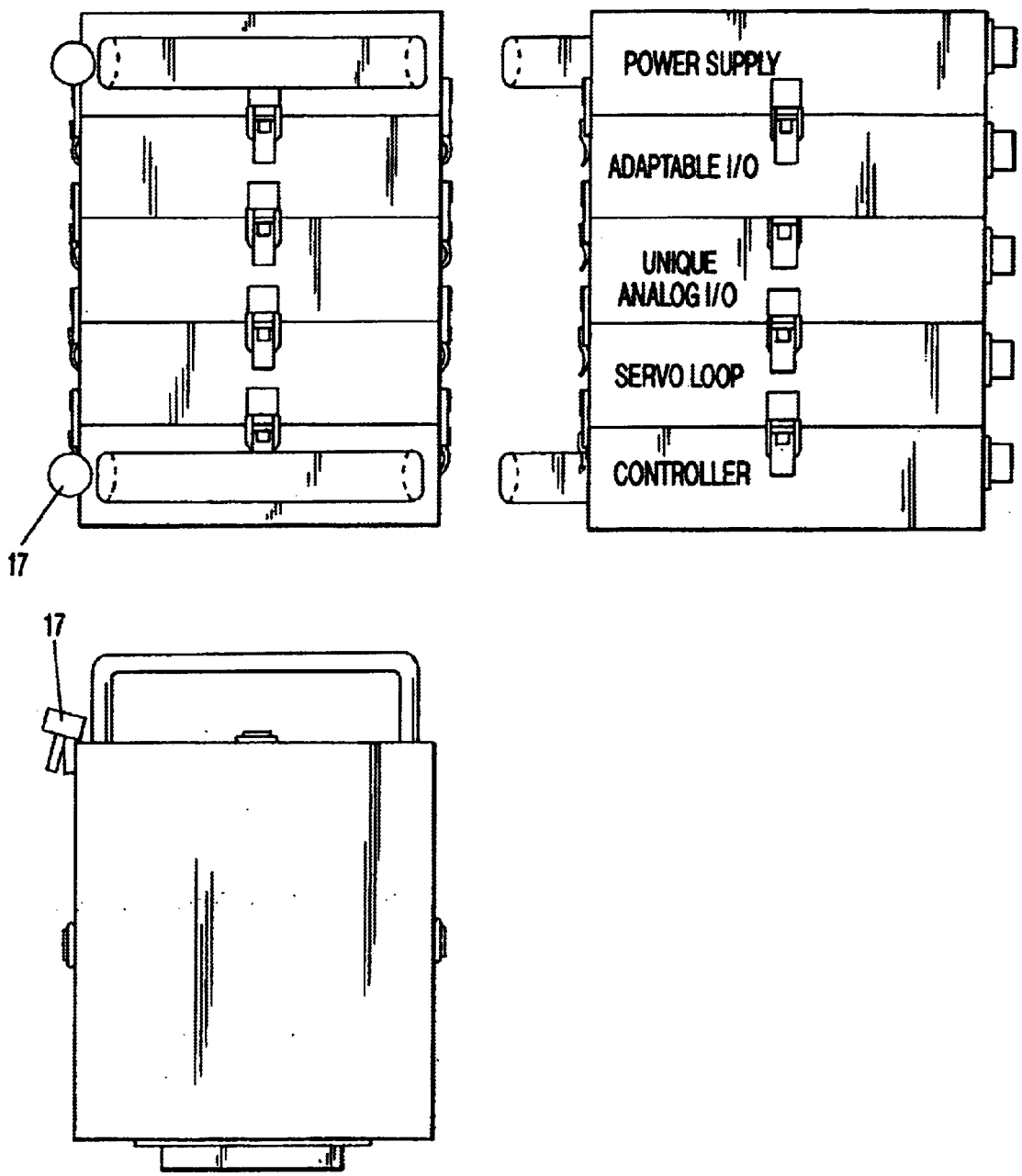
FIG. 3 shows an assembled module stack in accordance with the present invention.

An example of the resulting stack is shown in FIG. 3. The module stack is inserted into a tray in the vehicle and secured with swing bolts 17 located on the power supply and controller modules. Replacement and repair actions are performed by removing the complete SDC module stack from the vehicle tray, unsnapping the faulty module, separating the stack, inserting a good module, snapping the stack together, and re-installing the SDC stack into the vehicle mounting tray.

Figure 4:
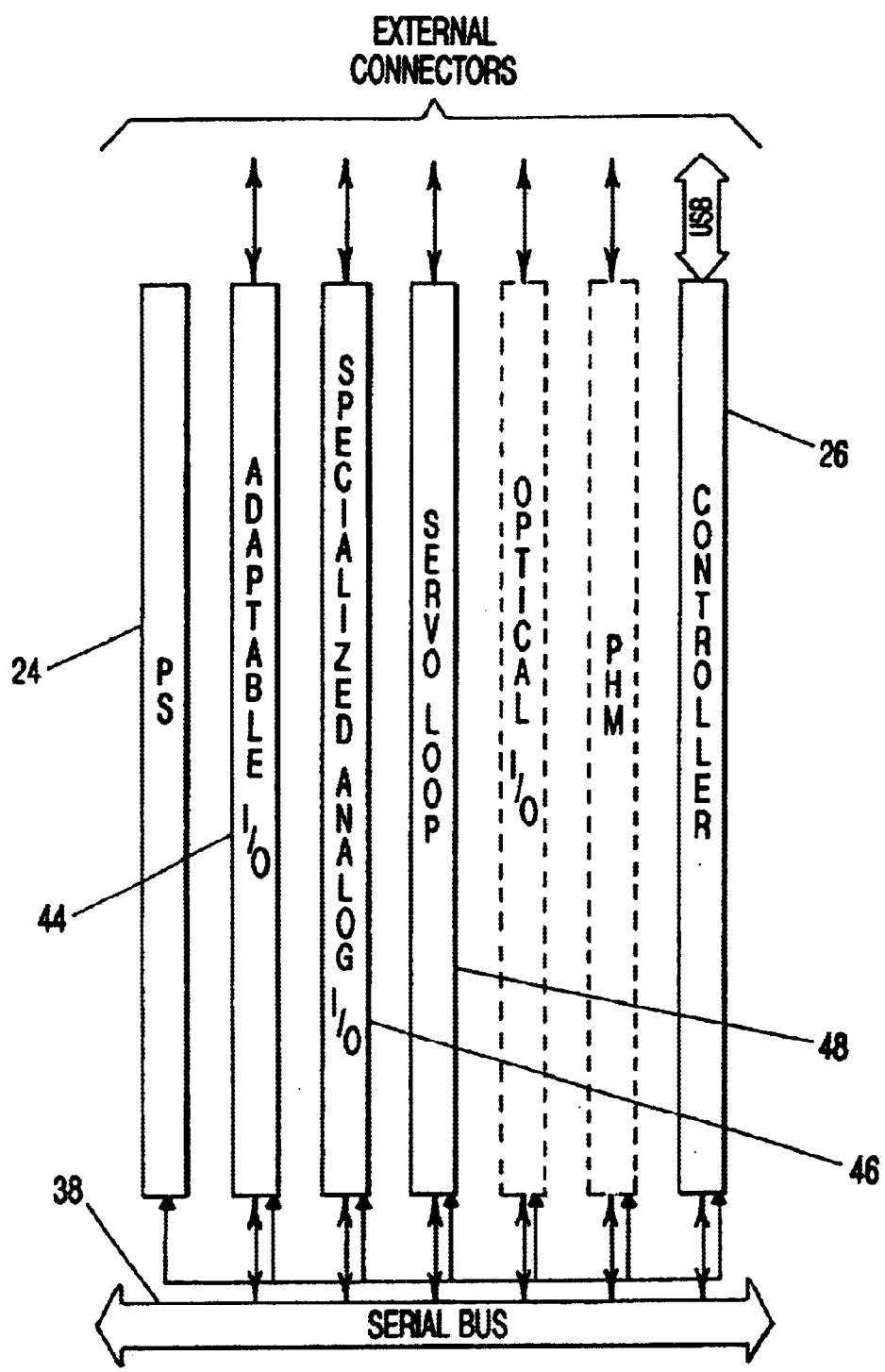
FIG. 4 depicts a preferred SDC internal structure in accordance with the present invention.

A USB serial bus 38 provides the interface between the individual modules as shown in FIG. 4. Each module provides the appropriate terminations and bus interface to allow up to 10 modules to be stacked together.

The baseline SDC includes standard modules of the following types: power supply 24, controller with serial I/O 26, adaptable analog and discrete I/O 44, analog I/O 46, and servo loop closure 48. Optional implementations can include optical serial bus interface modules, Prognostic Health Management (PHM) processing modules, as well as other unique designs.

Figure 5:
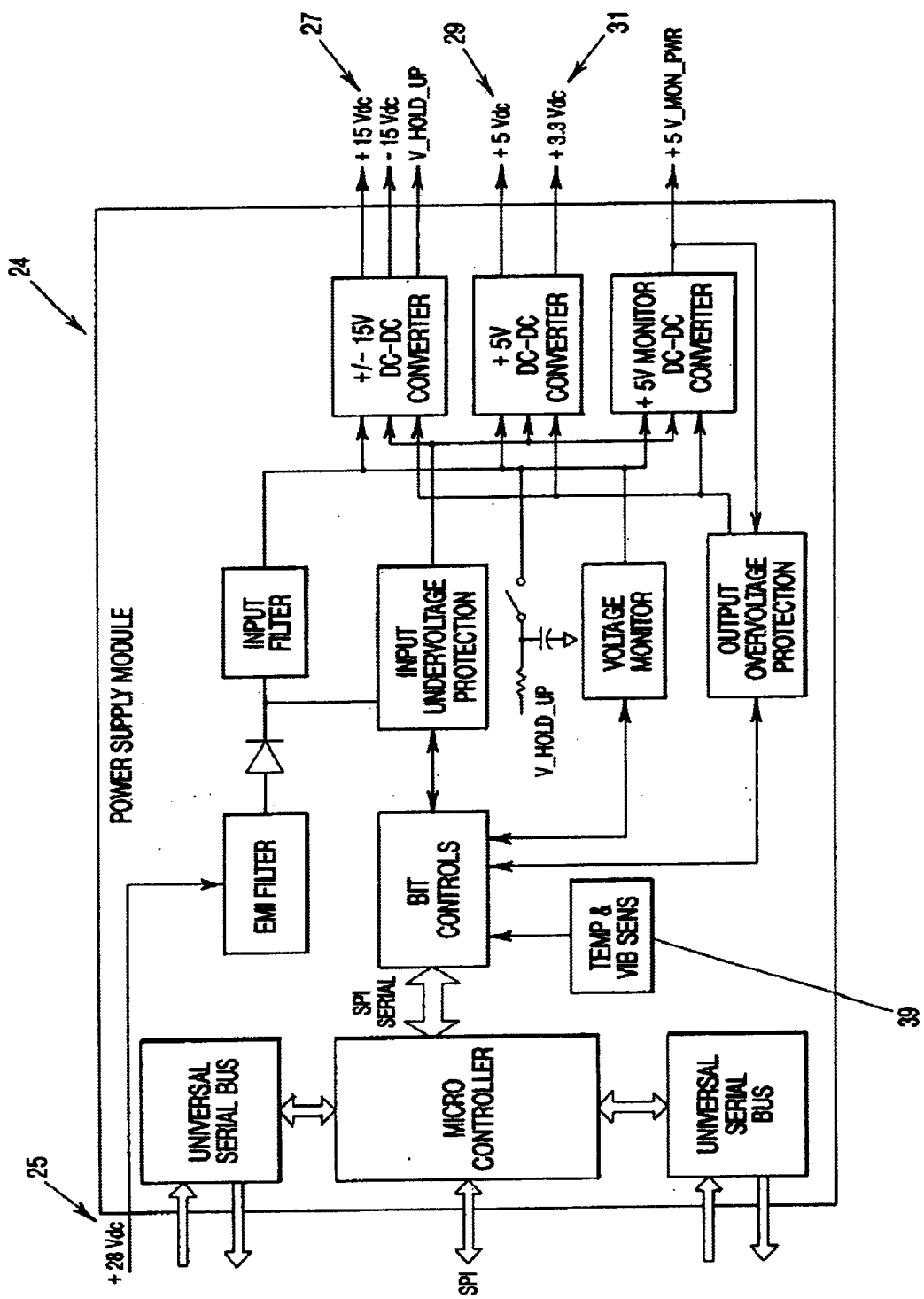
FIG. 5 is a diagram of a preferred power supply module in accordance with the present invention.

A preferred SDC power supply module 24 is shown in FIG. 5. It inputs vehicle power 25 and converts it to ±15 VDC 27, ±5 VDC 29, and ±3.3 VDC 31 to power the electrical components in the stacked modules. I/O device power is obtained at each module connector from the vehicle power bus. Other voltage levels can be provided in the power supply module 24 as required in the specific modules.

The power supply contains sensors 39 for measurement of environmental temperature and vibration levels that the module has experienced. This information is made available to be stored in other modules in that same location.

Figure 6:
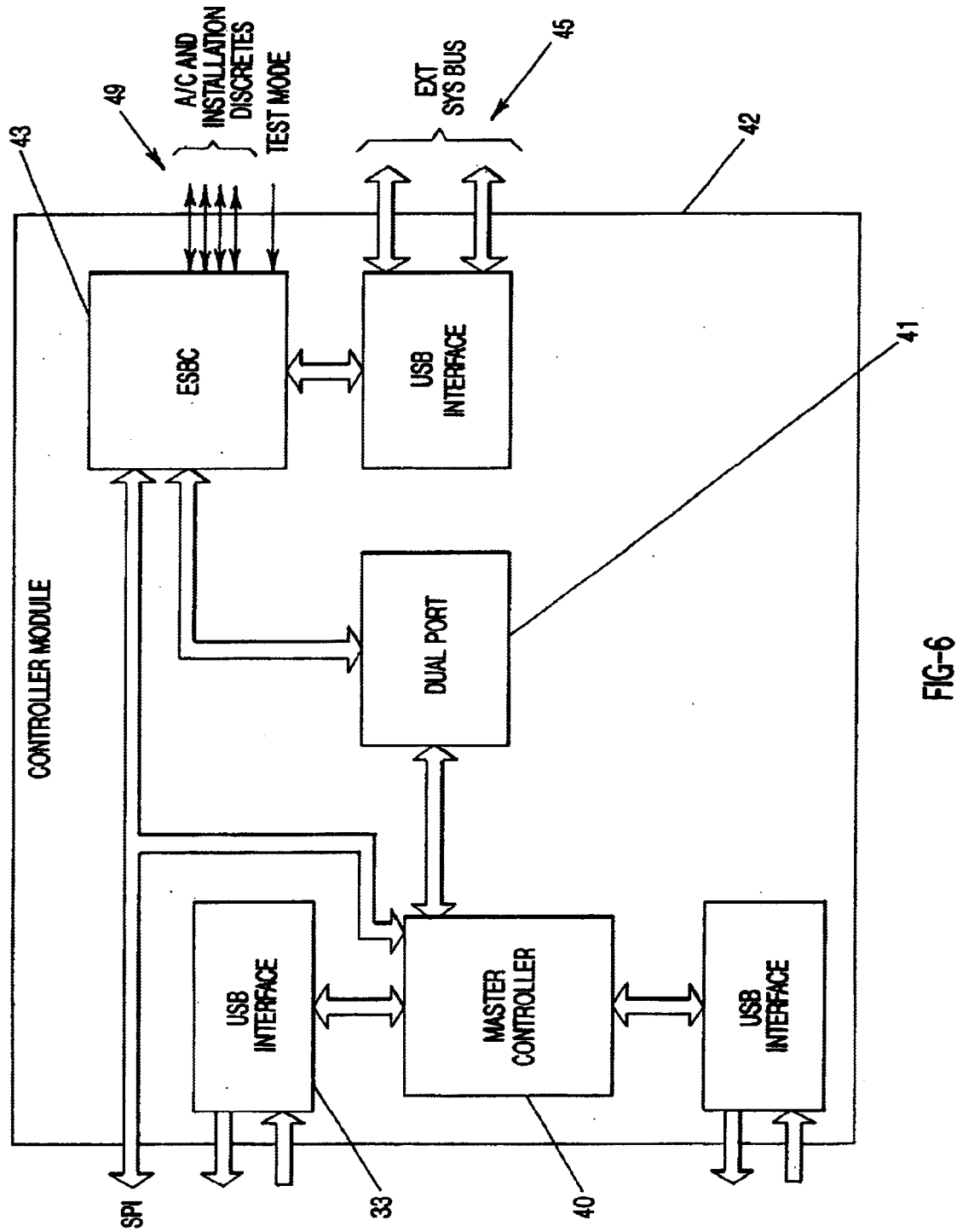
FIG. 6 shows a preferred controller module in accordance with the present invention.

The controller module 26, defines the configuration of all I/O modules, controls the SDC collection and output of data, controls the SDC communication with the system computer, performs SDC PHM and BIT, and performs potential data processing and filtering. A preferred controller module is shown in FIG. 6. It contains two identical microcontrollers, a master controller 40 and an External System Bus Controller (ESBC) 43. A dual port 41 interface is used to buffer data from external system bus 45 to internal USB bus 33. Controller module 26 contains the root HUBs for the two SDC USB busses. This embodiment of controller module 26 is an implementation of the controller module in support of an external USB vehicle system bus. Other system busses (429,1553,1394) architectures would be implemented in a similar manner (not shown). The SDC controller can be implemented with one of three basic types: micro-controller, state machine, or DSP.

Figure 7:
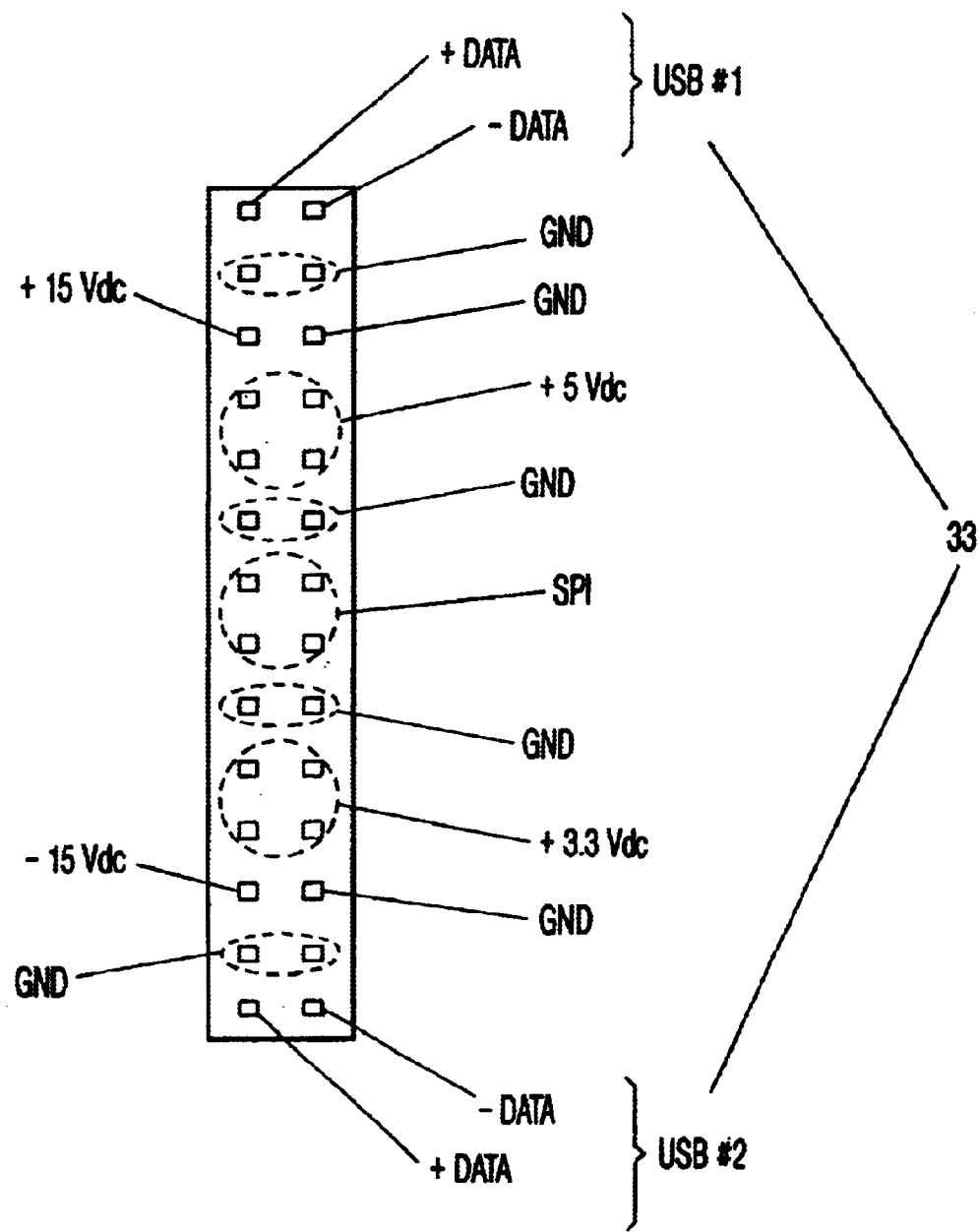
FIG. 7 shows a preferred stacking connector pin configuration in accordance with the present invention.

A preferred stacking connector 20 embodiment utilizes a pair of USB electrically compatible buses 33, as shown in FIG. 7, for internal SDC communication. This high-speed (12 Mhz) bus supports isochronous (USB synchronous) data transfers that are utilized to synchronize data conversion and transfers to the external system bus and minimize latency. Although many other bus structures will work for internal data transfers and synchronization, the USB has a particular implementation that supports synchronization and integrity in the basic protocol. The dual pair of USB buses 33 provides additional health management diagnostic capability and availability. The application of the USB bus to the SDC architecture facilitates an avionics system with plug-and-play features similar to the Personal Computer (PC).

Figure 8:
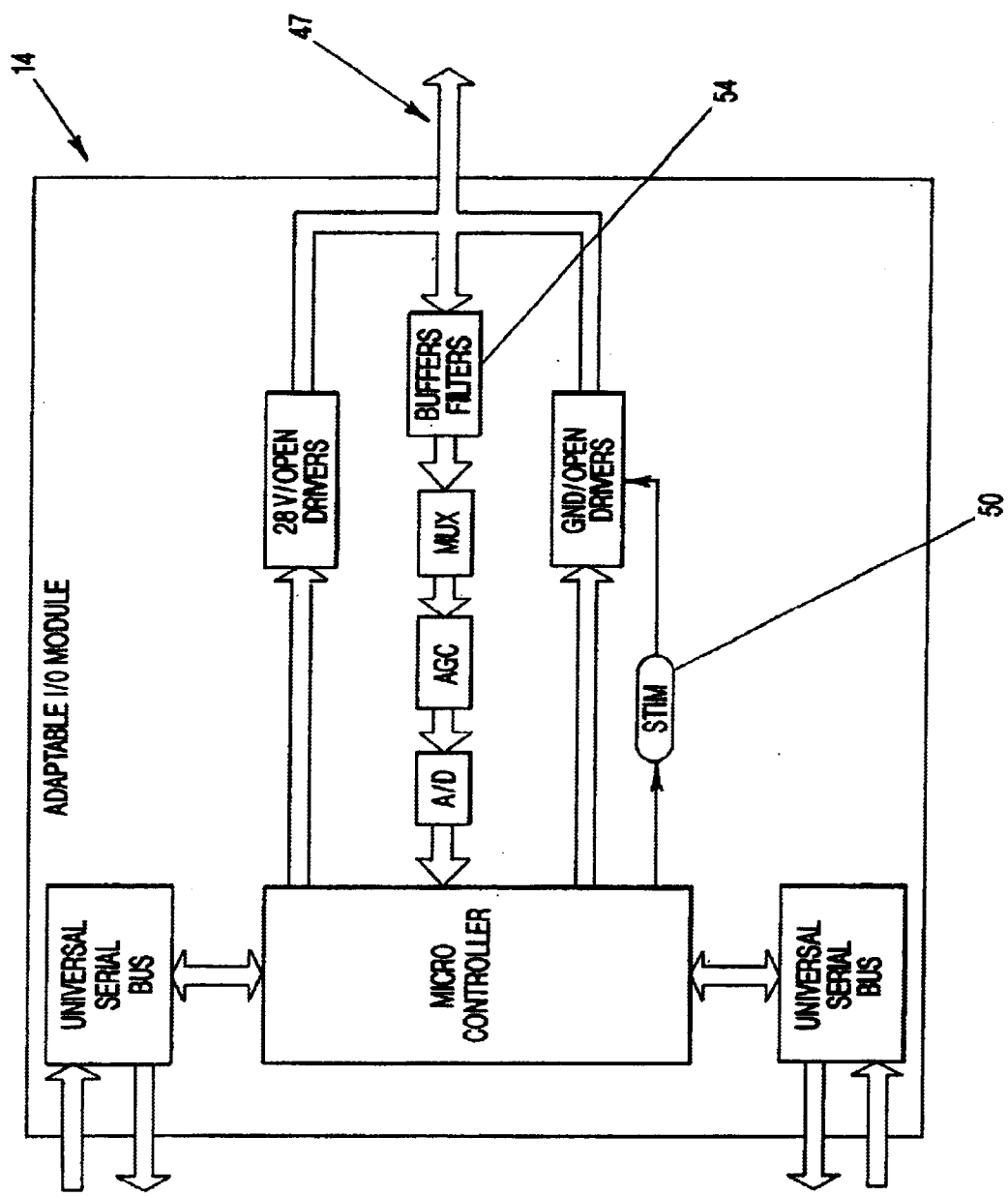
FIG. 8 is a block diagram of a preferred adaptable I/O module in accordance with the present invention.

Adaptable I/O module 14 is capable of handling all vehicle input and output discrete types and large range analog signals, regardless of the pin to which they are connected. A block diagram of a preferred adaptable I/O module is shown in FIG. 8. Each I/O pin 47 is adaptable (programmable) to configure it for level (28 vdc or gnd), discrete or analog, and direction as specified by the controller module for the SDC installation location. Installation data is stored in the controller module 26. Configuration takes place upon power up when each device signals the SDC controller and serial I/O module what its class/type is. The controller module then establishes the desired configuration based on vehicle installation discretes 49.

The preferred embodiment includes a digitally controlled first order filter 54 on each I/O pin whose characteristics are specified by the controller module.

All outputs are testable through the insertion of BIT stimuli 50, which is wrapped back for confirmation of level control. All outputs power up in a high impedance state until enabled by the controller module.

Figure 9:
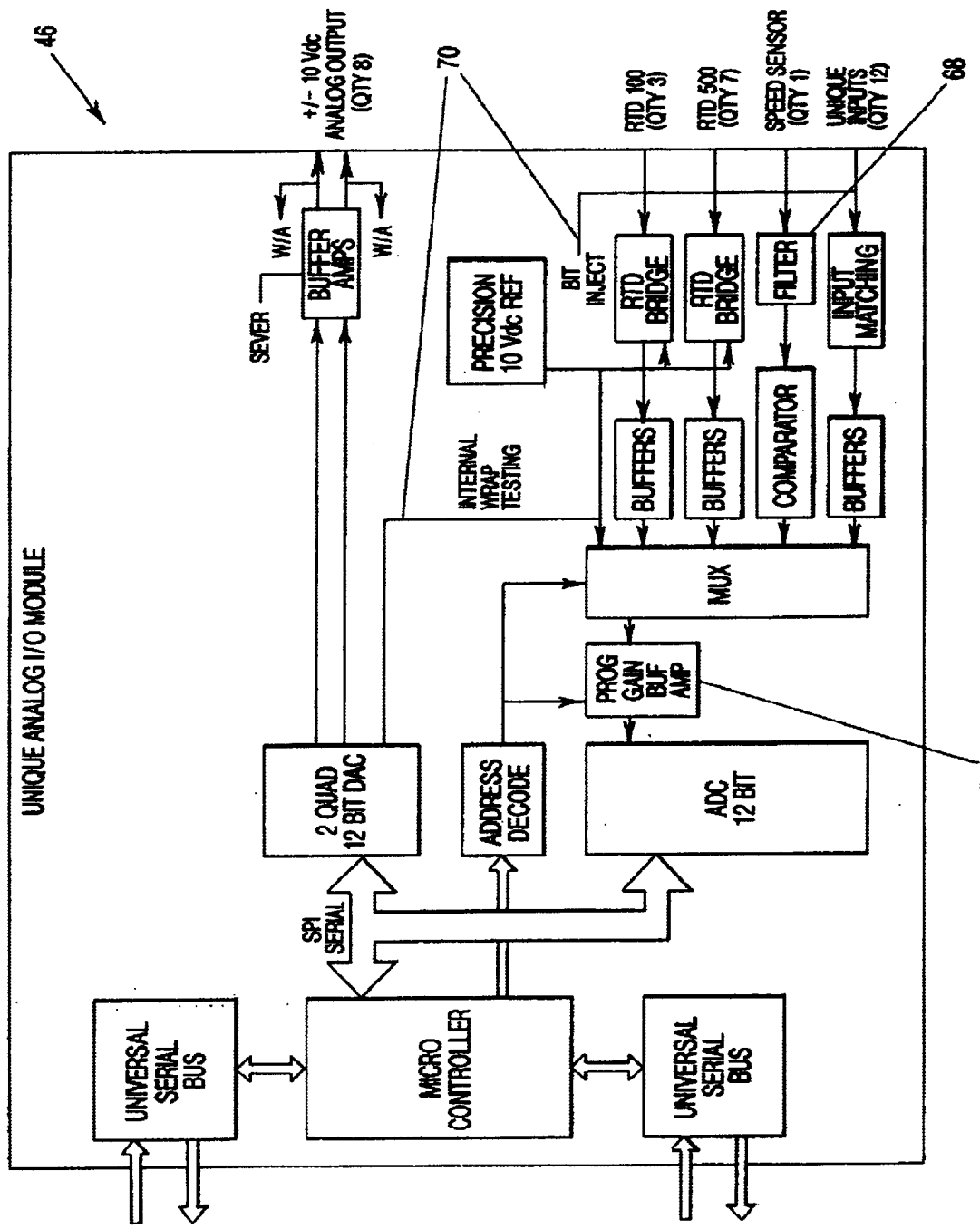
FIG. 9 shows a preferred analog I/O module in accordance with the present invention.

The unique Analog I/O Module 46 handles the unique vehicle installation signals and is uniquely designed for that vehicle. If the vehicle contains multiple instances of this module it can perform any configuration settings designed into the module on controller module commands. An example of a specific vehicle embodiment is shown in FIG. 9. In this example, input gains 71 and filters 68 are adjustable by controller module commands.

All inputs/outputs are testable through the insertion of BIT stimuli 70, which are wrapped back for confirmation of level control.

Figure 10:
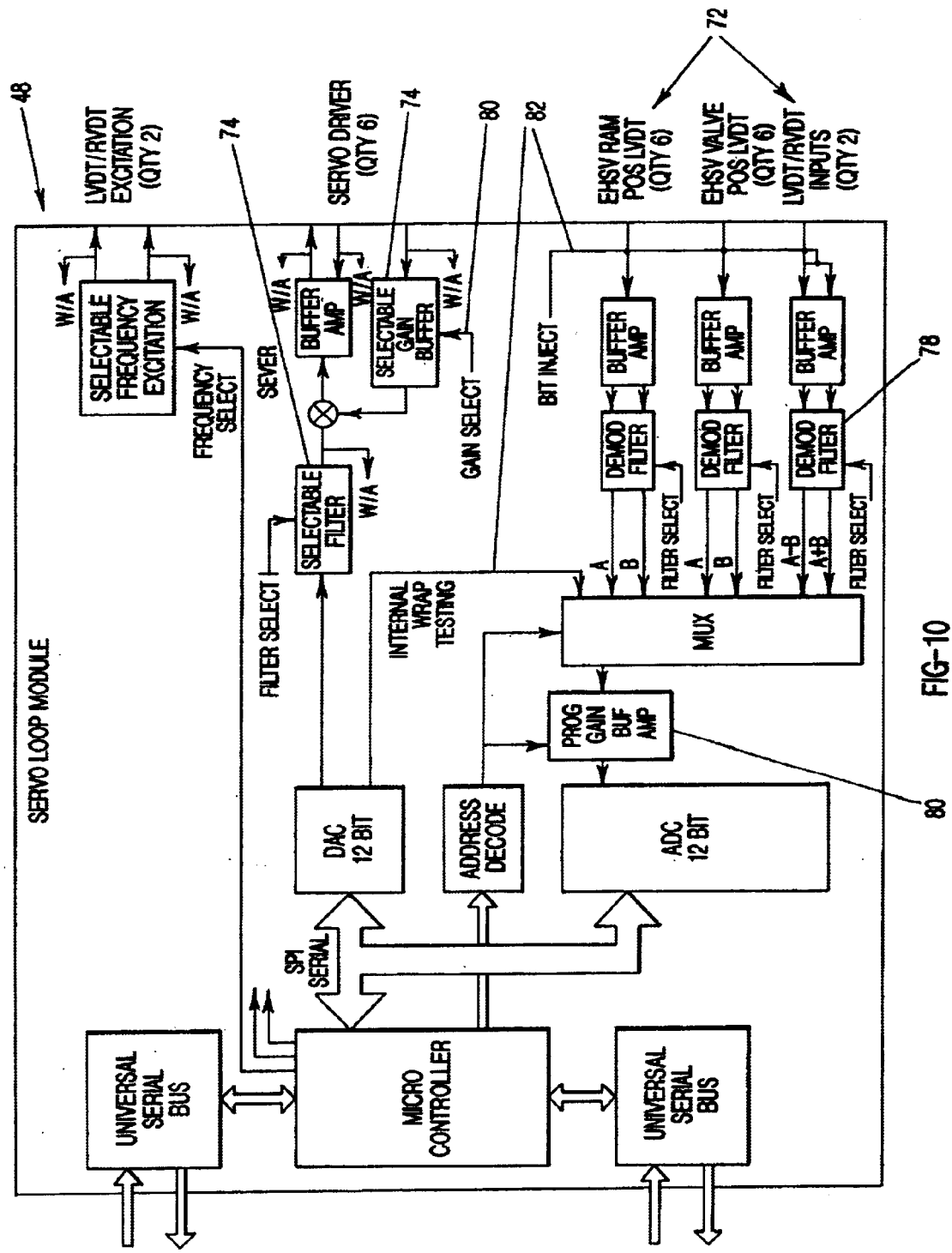
FIG. 10 shows a preferred servo loop I/O module in accordance with the present invention.

An example of a servo loop module is shown in FIG. 10. The servo loop module 48 is capable of handling all inputs and servo drive outputs associated with several servos and LVDT/RVDT feedbacks 72. Execution of the loop closure control laws, mode logic, and second order filtering is provided on the module by utilizing the processing power of the module's microcontroller. Feedback gains 80, filters 78, and servo drive parameters 74 are configurable by the microcontroller.

All inputs/outputs are testable through the insertion of BIT stimuli 82, which is wrapped back for confirmation of level control.

Figure 11:
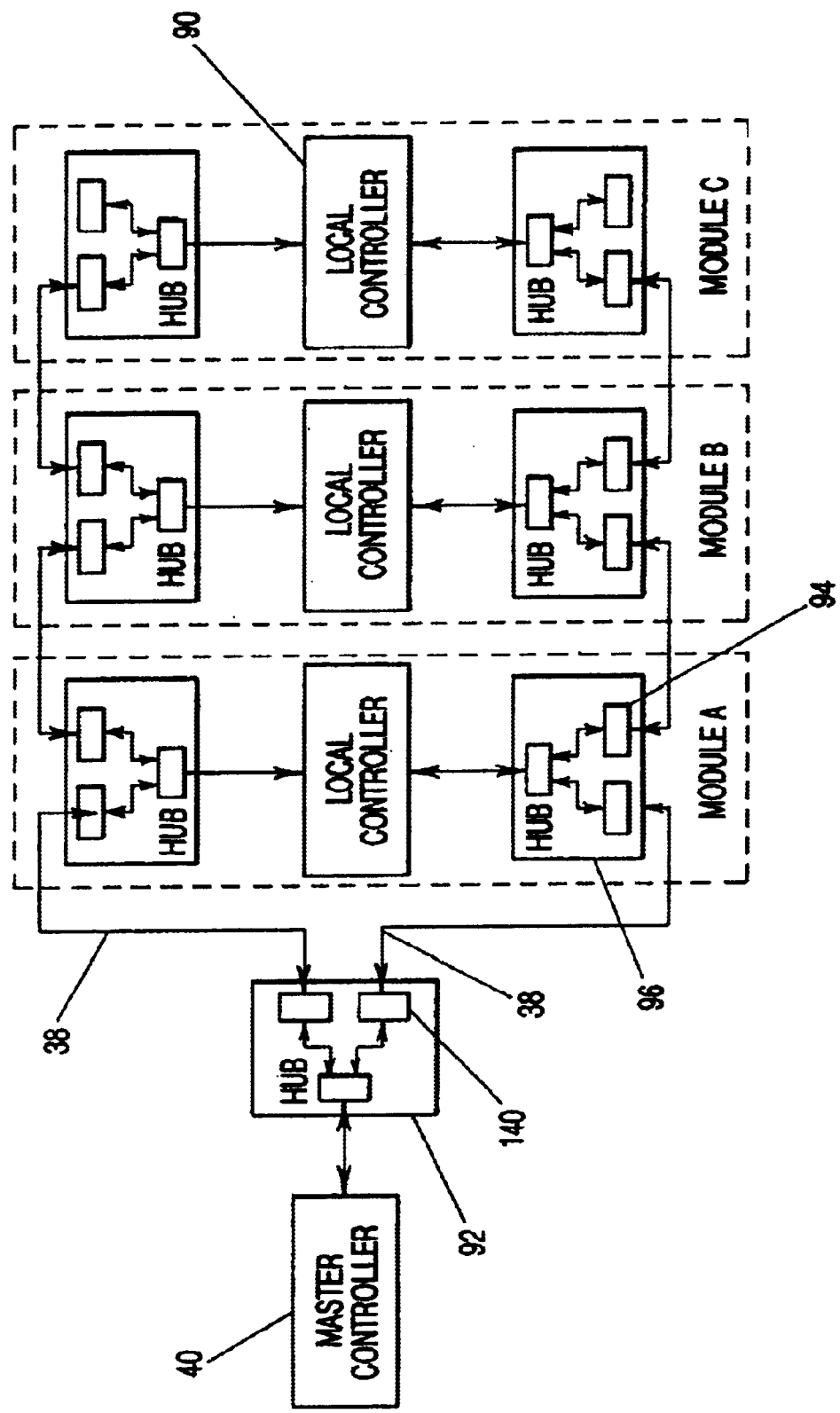
FIG. 11 shows a preferred USB stacking bus architecture in accordance with the present invention.

The previous text describes a hardware stacking modular design that allows all types of functions to be selected for each unique vehicle location at installation time. In the preferred embodiment this flexibility is enabled through software, which is individualized for each module, according to type and function of the module. FIG. 11 shows the USB interconnect between the controller module and the local modules. Each I/O module contains a local microcontroller 90 responsible for handling the debouncing, filtering, control laws, and etc. associated with the I/O type as well as the stacking bus protocol. The USB standard interface protocol provides the interconnecting communication link that is used to identify, configure, and communicate with the I/O stack.

The SDC software makes use of the USB bus capability to implement; live connections, endpoint identification, isochronous data transactions, bulk data transactions, and framing control. The result is a high-speed deterministic data collection and distribution system. The software architecture incorporates a dual bus link 38 from host hub 92 through each module in the SDC.

Each module enables its HUB repeater function to the downstream port 94 when it completes it's own enumeration (identification and address specification). Up to 10 modules can be connected in series in this manner. Each module's HUB 96 can be configured to have multiple endpoints for defining pipes or data streams between master controller 40 functions and local controller 90 functions.

Figure 12:
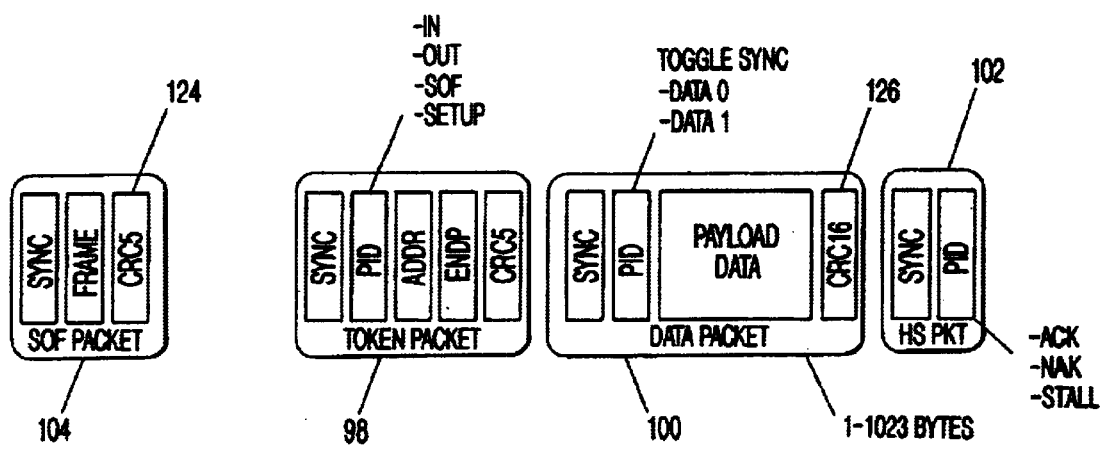
FIG. 12 shows a typical USB standard message structure.

Overall, control of the bus is provided by the Controller Module through token requests following USB message formats. Four primary types of USB messages structures are illustrated in FIG. 12.

A preferred embodiment implements three basic types of USB data transactions:

a) Control transfers—utilized during the enumeration process to identify a module and to set it's I/O configuration to the specific vehicle and SDC location needs. The master controller issues a token packet 98 requesting specific information. The local controller addressed by the token packet responds either with a data packet 100 or a handshake packet 102.

b) Isochronous (USB standard term defining periodic, continuous data transfers between a host and device) data transfers—the means by which I/O data is, guaranteed to be transferred at the rates required and at the specific time within a frame and/or on a specific frame number. The Start of Frame (SOF) packet 104 is issued by the master controller at regular intervals. Each local controller utilizes this to anticipate requested data transactions. The master controller requests data transfers with a token packet 98 and the local controller is able to respond immediately with the data packet 100.

c) Bulk data transfers—continuous BIT monitoring and other non-timing critical transfers in the Flight State.

Module configuration occurs at power-up. During enumeration each module provides the following information to the controller module through control data transfers:

Module type/class (Adaptable I/O, Servo Loop, etc.);

Module manufacturer and part number;

Module serial number; and

Last configuration setting.

The controller module uses this information to determine if the correct module is installed for this location in the vehicle and to determine if the I/O configuration is correct. If the I/O configuration is incorrect, indicating a new module has been installed the controller module performs a configuration update on that module. This includes a setup token packet 98 followed by "out" data packets 100 specifying:

I/O direction for each I/O provided by the module;

Gain and filter settings for each I/O provided by the module;

Framing sequencing (input or output timing for each I/O); and

Initialization of the frame counter.

Each I/O module stores the configuration setting in its configuration and sequencing tables located in non-volatile memory.

Figure 13:
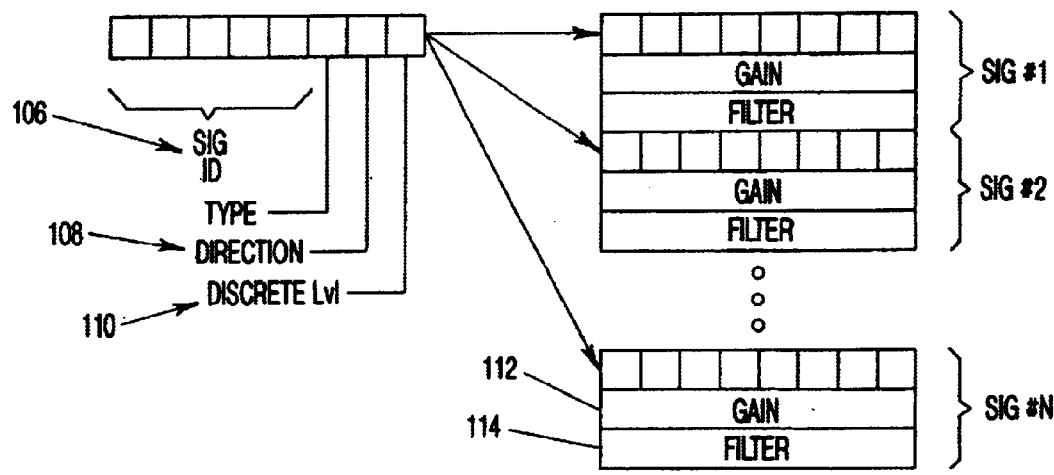
FIG. 13 shows a configuration table in accordance with the present invention.

FIG. 13 illustrates the content of the configuration table for an adaptable analog/discrete I/O module. Each signal connection 106 has several parameters: direction 108, level 110, gain 112, filter 114 that can be specified. The characteristics of each module are different and therefore the configuration table content will vary.

Figure 14:
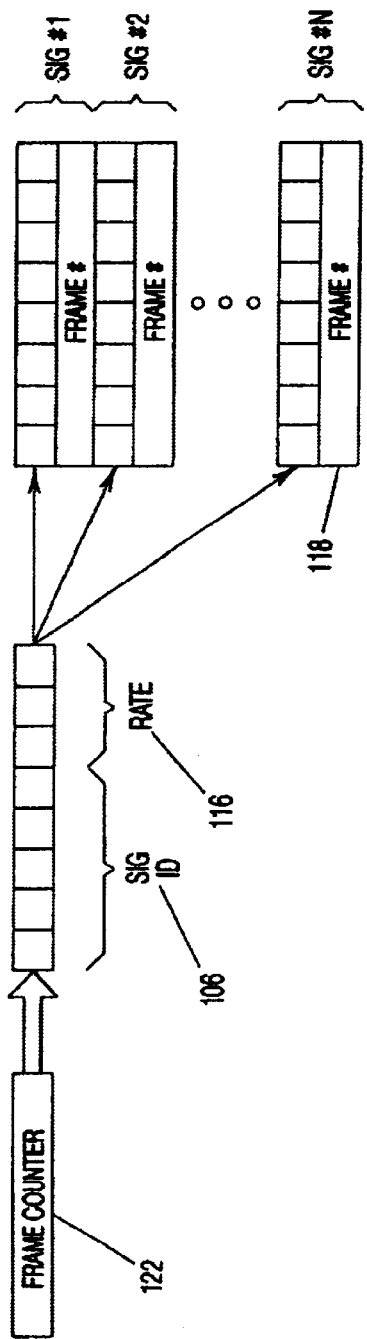
FIG. 14 shows a sequencing table in accordance with the present invention.

FIG. 14 shows the content of the sequencing table. Each signal connection 106 is given a rate 116 and first frame number 118 when data must be ready for transfer. In the preferred embodiment the rate 116 can be specified at 5, 10, 20, 40, 80, 160, 320 Hz intervals, although those skilled in the art will recognize that numerous rates are possible. The frame counter 122 is matched against the frame number 118 to specify signals to be transferred during that frame. The signals can be grouped into common rate tables to facilitate software access.

Figure 15:
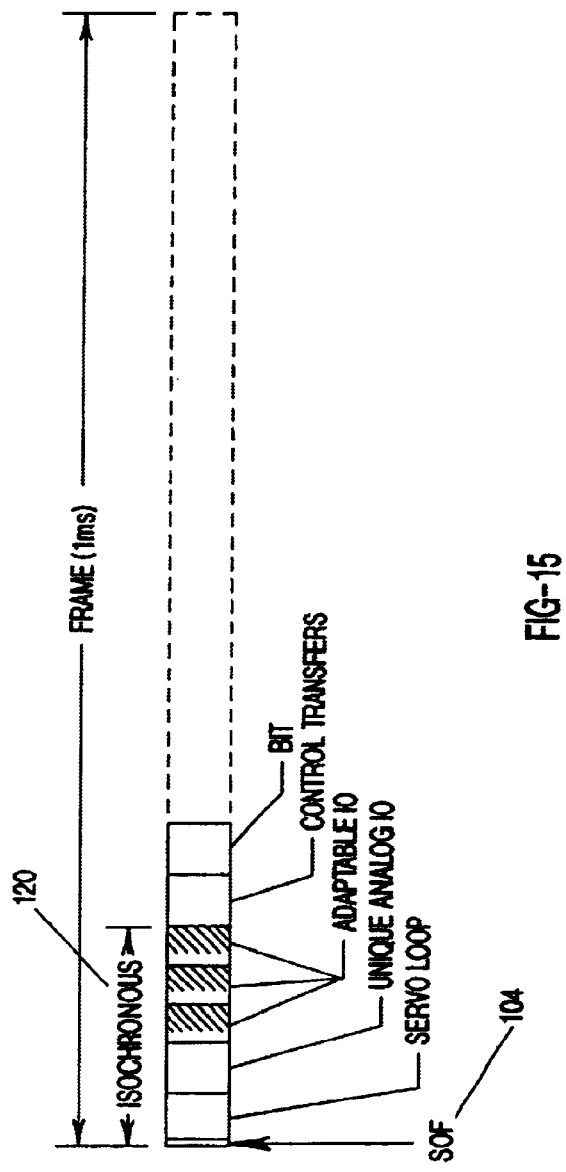
FIG. 15 shows a preferred data transfer timing in accordance with the present invention.

The SDC module stack is tightly synchronized for all isochronous data transfers. FIG. 15 illustrates the location and order of the data transfers within one frame. The Controller Module broadcasts the Start of Frame (SOF) packet 104 to all modules at the start of each 1 ms frame. Each module uses this packet to synchronize data conversions to the start of frame and unique frame using the frame number 118 as specified in the sequencing table. The SOF packet signifies the beginning of a period during which all isochronous data 120 from all SDC modules is transferred to the Controller Module.

The sequencing table is deterministic. All input data conversions the Controller Module is expected to request during a given frame number 118 are predetermined, and the data is converted by the I/O module during the previous frame. The input data is then immediately available for transfer upon a Controller Module isochronous data request providing a minimum of latency on input data Output data is converted by the I/O module immediately on completion of the isochronous data transfer period in the same frame in which it was received for a minimum of data latency.

Both the Controller Module and each I/O module maintain a frame counter 122 to direct execution of the proper portion of the sequencing table. The I/O modules monitor the SOF packet 118 "frame number". If the frame number does not match the module's own count; the module will resynchronize to the specified frame count and issue the requested isochronous data packet when requested. If a module must resynchronize, it will also set the data validity byte to invalid.

The SDC utilizes the USB standard fault protection schemes and wraps them into additional failure detection mechanisms. USB standard data transaction CRCs are used to assure data integrity on the request tokens as well as data transfers. Each SOF packet and token packet contains a 5 bit CRC 124 that is used to validate the Controller Module request. An error in the message will result in the addressed I/O Module responding with a Negative Acknowledgement (NAK). Each data packet contains a 16 bit CRC 126 used to validate data packet integrity.

During initial enumeration, the Controller Module verifies that the correct modules are attached as specified by the vehicle and location key discretes 49. The module class/type is checked for Adaptable I/O, Unique I/O, Servo Loop etc. identification prior to its USB attachment.

The redundant USB bus 38 provides additional availability after failure but is also used to isolate HUB 96 failures on the other bus.

Additional monitors include Loss of Activity (LOA), Babble, Bus activity extending past End of Frame (EOF), and Start of Packet (SOP) without End of Packet (EOP). Recovery from these faults requires that the device driving the illegal state is isolated from the bus by disabling the down stream port 94.

The External System Bus Controller (ESBC) 43 performs the functions supporting; external system bus to USB interface, vehicle ID and location, and SDC programming control. These functions are independent of installation and need not be changed and are fixed programming functions at manufacturing time.

Programming of the master controller 40 and the SDC stack I/O module local controllers 90 is accomplished by the ESBC through external system bus message control. An SPI bus 51 interconnects the Controller Module master controller with the I/O Module local controllers for this purpose. Each I/O module programming function is enabled sequentially while it is held in reset for this function. Interlocks prevent enables from occurring during Flight State 130.

Figure 16:
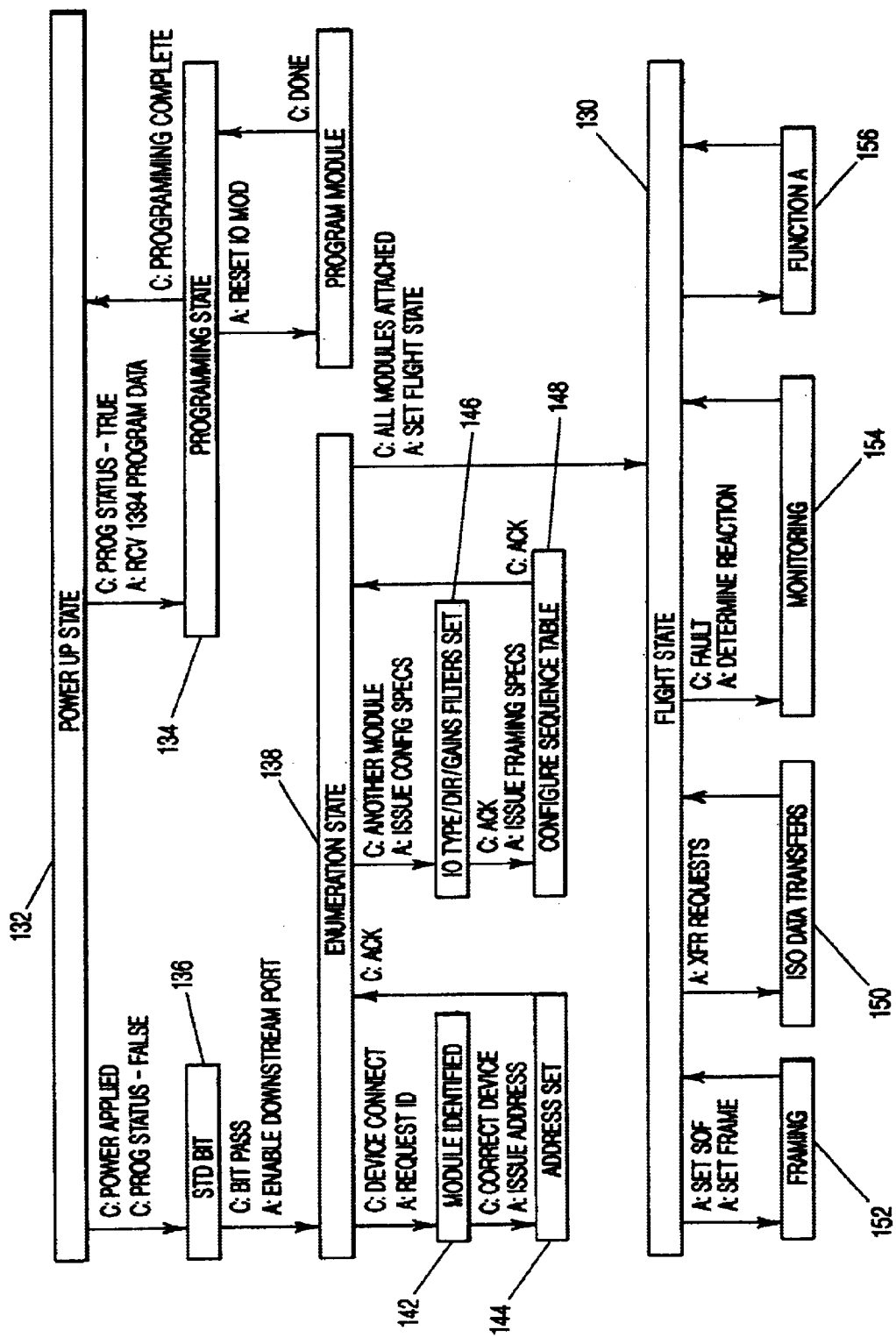
FIG. 16 shows a preferred controller module state diagram in accordance with the present invention.

The various states of the Controller Module master controller are shown in FIG. 16. In the power-up state the ESBC 132 identifies the vehicle and SDC installation location by discrete input keys 49. This information provides pointers to sequence table selections.

The ESBC is responsible for determining whether a normal power up sequence is occurring or whether the programming state is to be entered. This is accomplished through a sequence of external system bus messages and vehicle state discretes. If the programming state 134 is set the ESBC selects the proper module to be programmed, resets that module and transfers the data through an internal SDC SPI programming bus. If the programming state is false, both the ESBC and the master controller perform their individual standard BIT tests 136 (e.g., instruction set, register, FLASH, NVM, timers, WDT, Dual Port, and etc.). Upon BIT completion the ESBC will wait for flight state initiation.

Upon entry into the enumeration state 138 the master controller proceeds with enumeration of all I/O modules. The enumeration process begins with an enable on the downstream port 140 of one of the Controller Module USB busses. The first downstream module responds with a soft attach request. If the downstream module is identified TBD and class and type are correct for the installation the master controller assigns it an address 144. This sequence is repeated for each subsequent downstream port until the power supply is reached. The Master controller then performs the same sequence on the other USB bus.

The second step of the enumeration process establishes the configuration of the inputs and outputs on each I/O module and the selection of the conversion sequence table. The first step is to determine if the current configuration of the I/O module is incorrect (indicating a changed module). An incorrect configuration results in the Master controller providing the proper configuration 146 and sequence 148 for the I/O module to load into its NVM. A correct configuration causes the Master controller to pass on to the next I/O module.

When the complete SDC stack has been configured the Master controller informs the ESBC, microcontroller that the stack is ready for Flight State 130. The ESBC passes this through the external system bus to the Vehicle Management Computer (VMC). If any failures occur the conditions are passed to the VMC instead.

In the flight state the ESBC performs external system bus to Dual Port packing and unpacking for the USB bus data transfers 150 and controls other controller I/O functions.

The Master controller handles the Dual Port to USB transactions and maintains the SDC stack synchronization and framing 152. It issues the isochronous data transfer requests in accordance with it's own sequence table order.

While in the Flight State the Master controller monitors 154; frame-sequencing responses from the I/O Modules, received USB data integrity, and performs activity health monitoring on the ESBC. Any faults are issued to the VMC and stored into NVM flight history.

Continuous BIT and IBIT functions are run while in this state. Other data manipulation functions are also executed in this state 156.

Figure 17:
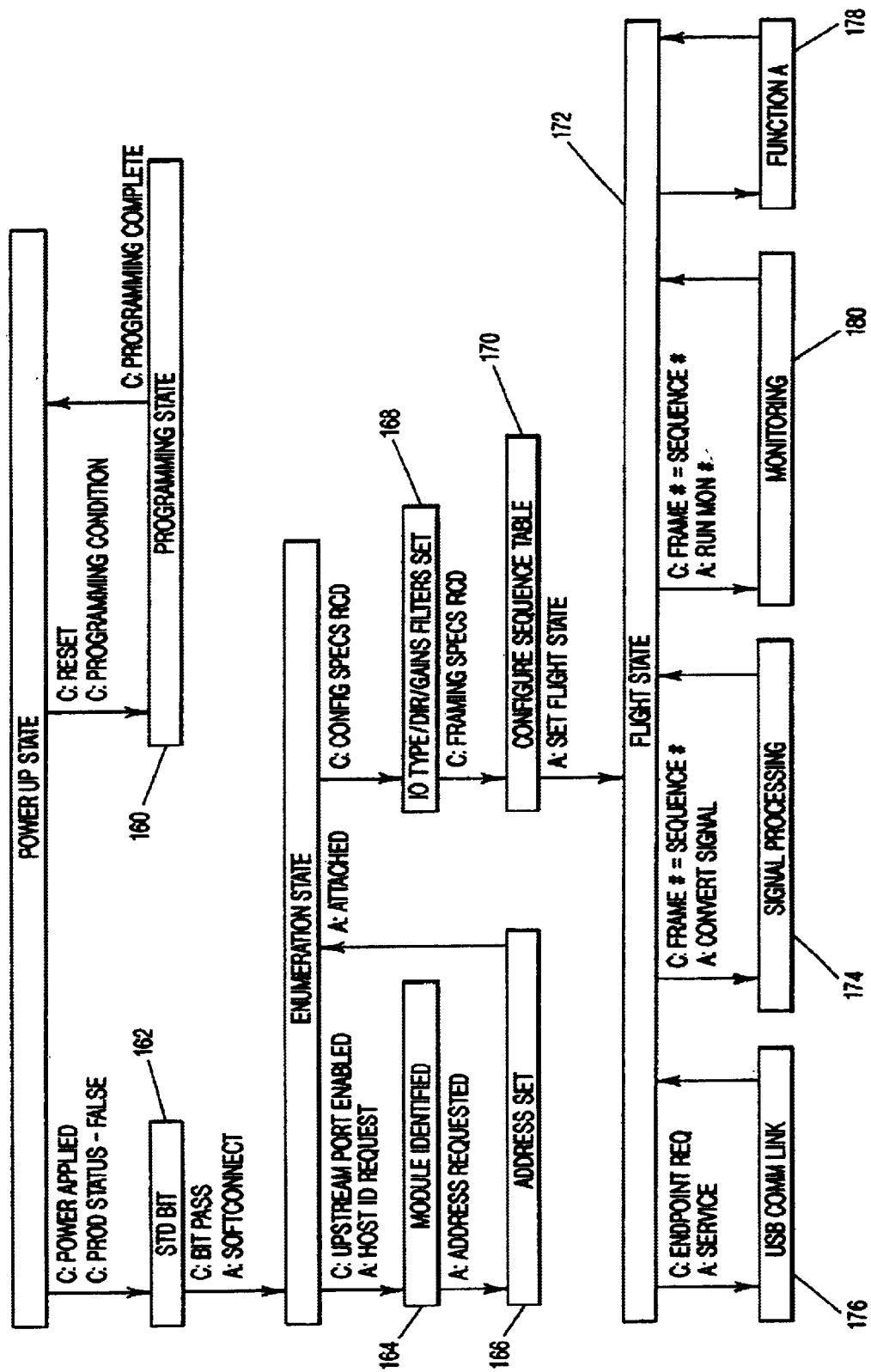
FIG. 17 shows a preferred I/O module state diagram in accordance with the present invention.

The various states of the I/O Modules are shown in FIG. 17. The programming state 160 is set by ESBC reset of the module microcontroller. Program data is transferred through the internal SDC SPI programming bus 51. If the programming state is false the microcontroller performs its standard internal BIT tests 162 (instruction set, register, FLASH, NVM, timers, WDT, and etc.). It then performs I/O functionality tests on its I/O type through BIT stims and internal wraps. Upon BIT completion the module microcontroller sets the soft connect request and waits for enumeration.

The enumeration process is initiated by a module identification 164 request by the master controller. If the module class and type are correct for the installation the Master controller assigns it an address 166. When an address is confirmed the I/O module enables its own downstream port and allows the Controller Module to communicate through the HUB repeater for enumeration of other modules in the stack.

The second step of the enumeration process establishes the configuration 168 of the inputs and outputs on each I/O module and the selection of the conversion sequence table 170. It is also controlled by the master controller. The first request is for current configuration and sequence table information. If it is correct the master controller passes on to the next I/O Module. If it is incorrect the master controller provides the appropriate information to set the I/O for the vehicle installation location. The I/O Module controller sets the I/O direction and sets the analog gains and filter elements to the correct state during second step of the enumeration process.

Until the Controller Module commands the Flight State 172 the I/O outputs are disabled.

In the Flight State 172 the I/O microcontroller performs the specified signal processing 174 including filtering, debouncing, or other signal conditioning based on the sequence table order and the frame count. Data is packed or unpacked from the USB format for USB communication link 176 transactions between the controller module and the I/O Module. Driving the data conversion sequence from the sequencing table automatically synchronizes the data availability to the Controller Module expected isochronous data transaction requests.

I/O module functions 178; Control law (servo loops), data reduction algorithms, prognostic health management, and environmental data conversions (temperature and vibration) are executed according to the sequencing table.

Each I/O Module performs extensive monitoring 180 in the Flight State, for example, as follows: WDT; frame sequencing; data Integrity; I/O wraps; token monitoring; power monitoring; down stream USB faults; etc. Any faults are issued to the Controller Module and stored into NVM flight history. Continuous BIT and IBIT functions are run while in this state.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of a method and apparatus for a common architecture for remote collection and distribution of analog and digital data with stackable and disposable modules, is followed. It is intended that the scope of the present invention be defined by the claims appended hereto.

The embodiments of an invention in which an exclusive property or right is claimed are defined as follows:

1. A computer apparatus comprising a plurality of stackable modules, each module comprising a predetermined function, wherein said stackable modules comprise at least a power supply module and a controller module the computer apparatus comprising:

means to affix said computer apparatus to a vehicle, said computer apparatus configured to support the vehicle's vibration, thermal and electromagnet environmental conditions, comprising;

said stackable modules comprising guide pins for alignment and stabilization and quick disconnect clamps for holding the modules in place;

said each module comprising a stacking connector inserted internally into a next module further comprising an EMI seal and an I/O connector; and each stackable module comprises two layer encapsulated module comprising components embedded in a thermally conductive material and embedded in an electrically conductive material.

2. The invention of claim 1 wherein said (I/O) connector comprises local module power.

3. The invention of claim 1 wherein said stacking connector comprises a serial bus.

4. The invention of claim 1 wherein said stacking connector comprises a feed through connector for expansion, collapse and replacement of said modules to alter an I/O compliment through said I/O connector of said computer apparatus without modification of adjacent stacked modules.

5. The invention of claim 1 wherein said each encapsulated module comprises a Faraday cage to protect the module from electromagnetic exposure and an EMI sealing means to prevent electromagnetic emissions.

6. The invention of claim 1 wherein said stacking connector comprises a module programming bus.

7. The invention of claim 1 further comprising software and firmware to perform said predetermined function including gathering and distributing signals to the computer apparatus.

8. The invention of claim 1 wherein said modules further comprises a means for thermal dissipation.

9. The invention of claim 1 wherein said stackable modules further comprises a completed scalable data concentrator architecture which can be inserted into a tray and connector receptacle.

10. The invention of claim 1 wherein said modules provide identification information through the serial bus in the stacking connector to the controller module for installation validation consisting of at least:

module type;

manufacturer;

serial number; and last configuration setting.

11. The invention of claim 10 wherein the controller module utilizes vehicle installation discretes to identify location I/O requirements.

12. The invention of claim 10 wherein the controller module configures the each module to vehicle location requirements and notifies the computer apparatus of its status.

13. The invention of claim 10 wherein said I/O modules have the ability to dynamically change their I/O type, direction, filter, and gain characteristics.

14. The invention of claim 13 wherein the controller module and I/O modules perform integrity monitoring of the module stack.

15. The invention of claim 14 wherein each module monitors the synchronization frame with its own frame counter.

16. The invention of claim 14 wherein each module utilizes the USB start-of-frame, end-of-frame, start-of-packet, end-of-packet, loss of activity, and cyclic redundancy checks to verify data transmission integrity.

17. The invention of claim 14 wherein the dual USB bus is utilized to provide additional monitoring.

18. The invention of claim 1 further comprising I/O modules that are synchronized to a controller module driven frame.

19. The invention of claim 18 wherein said I/O modules perform their functions in the order pre-specified by the controller module.

20. The invention of claim 18 wherein said I/O modules transmit and receive data at the time pre-specified by the controller module.

21. The invention of claim 18 where in said I/O modules that are synchronized to a controller module driven frame means comprises an I/O sequence table.

22. The invention of claim 21 wherein the controller module pre-specifies the I/O module characteristics before it is enabled.

23. The invention of claim 21 wherein the pre-specification of I/O module configuration state comprises a configuration table.

24. A method for quick disassembly and replacement of computer modules in a computer apparatus on a vehicle, the modules comprising a plurality of stackable modules, each module comprising a predetermined function, wherein said stackable modules comprise at least a power supply module and a controller module, the method comprising the steps of:

affixing the computer apparatus to the vehicle;

configuring the computer apparatus to support the vehicle's vibration, thermal and electromagnetic environmental conditions comprising:

encapsulating the each module comprising a two layer encapsulation comprising embedding components comprising each module in a thermally conductive material an and embedding the components in an electrically conductive material;

aligning and stabilizing a module in any location in the stack of modules using guide pins;

inserting a stacking connector inserted internally into a next module; and holding the module in place with quick disconnect clamps.

25. The method of claim 24 further comprising the steps of removing a defective module and replacing the defective module with a functional module at any location in the stack without removal of other modules.

26. The method of claim 24 further comprising the step of adding a next application by stacking a next module with a predetermined I/O compliment to the plurality of stackable modules.

27. The method of claim 24 further comprising the step of providing the each module with software and firmware to perform the predetermined function.

28. The method of claim 27 further comprising the step of providing identification information from the each module to the controller module for installation validation.

29. The method of claim 27 wherein the step of providing the each module with software and firmware to perform the predetermined function comprises synchronizing the each module to a controller module driven frame.

30. The method of claim 27 wherein the step of providing the each module with software and firmware to perform the predetermined function comprises the step of dynamically changing I/O type, direction, filter, and gain characteristics.

31. The method of claim 27 wherein the step of providing the each module with software and firmware to perform the predetermined function comprises the controller module and the each module performing integrity monitoring of a module stack.

32. The method of claim 24 wherein the step of encapsulating comprises a faraday cage.

33. The method of claim 24 wherein the step of inserting a stacking connector comprises an EMI seal.

34. The method of claim 24 further comprising the step of dynamically configuring the stackable modules as defined by a vehicle installation at power up.

* * * * *